(No Model.) 4 Sheets—Sheet 1.
R. D. BRAIN & C. T. SHAFER.
APPARATUS FOR APPLYING STRIPS TO NEWSPAPERS OR OTHER PERIODICALS.
No. 444,167. Patented Jan. 6, 1891.
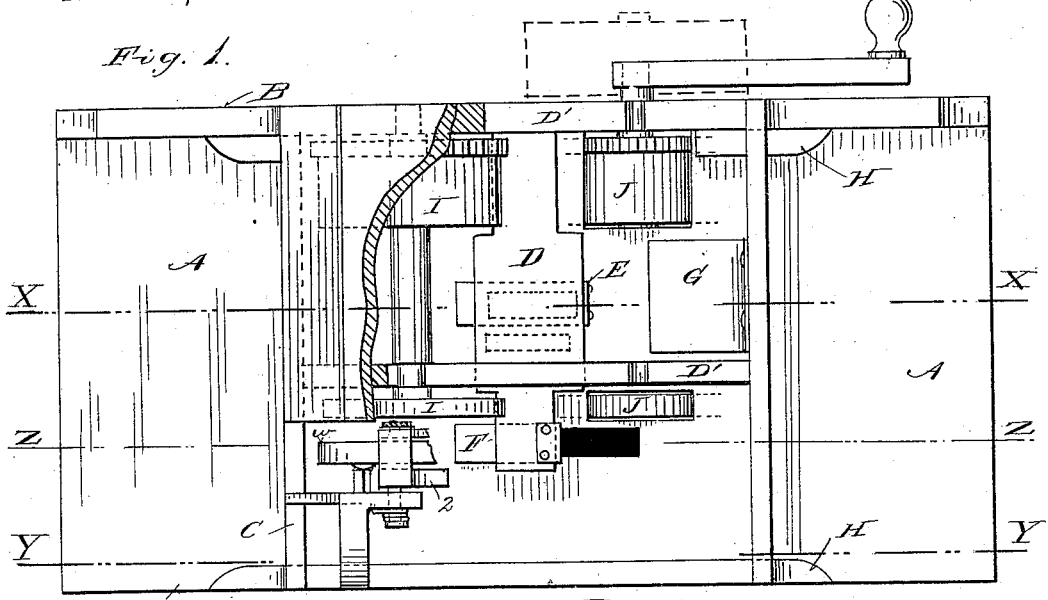
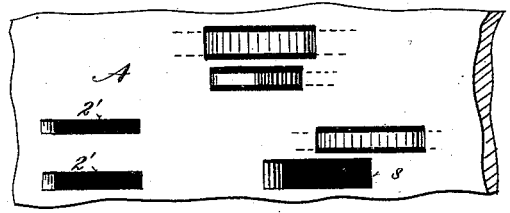
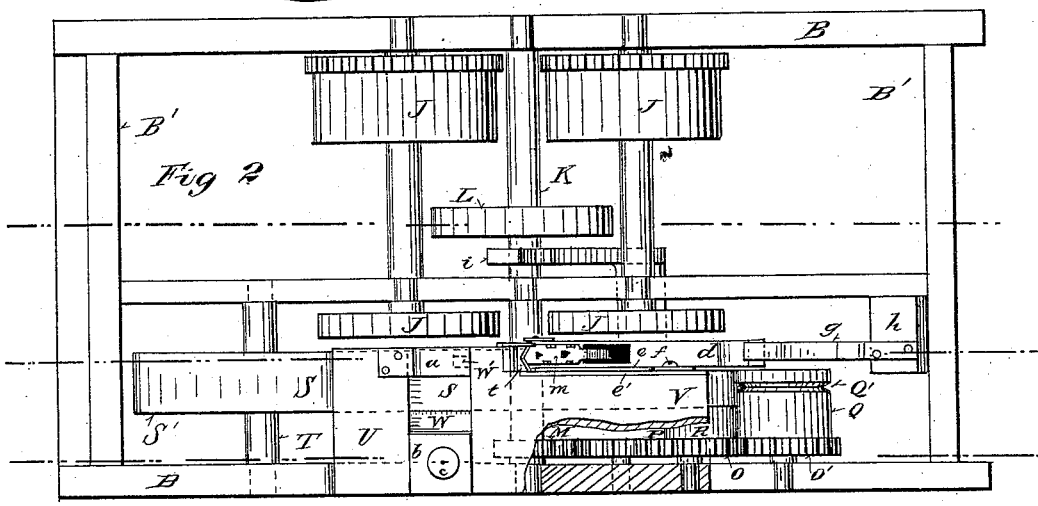
WITNESSES
H. M. Plassked.
Warren Hull.
INVENTORS
Robert D. Brain,
and Chas. T. Shafer,
By H. A. Toulmin,
their Attorney.

(No Model.) 4 Sheets—Sheet 2.

R. D. BRAIN & C. T. SHAFER.
APPARATUS FOR APPLYING STRIPS TO NEWSPAPERS OR OTHER PERIODICALS.

No. 444,167. Patented Jan. 6, 1891.

WITNESSES
H. M. Plaisted
Warren Hull

INVENTORS
Robert D. Brain,
Chas. T. Shafer, and
By H. A. Toulmin,
their Attorney.

(No Model.) 4 Sheets—Sheet 3.
R. D. BRAIN & C. T. SHAFER.
APPARATUS FOR APPLYING STRIPS TO NEWSPAPERS OR OTHER PERIODICALS.
No. 444,167. Patented Jan. 6, 1891.
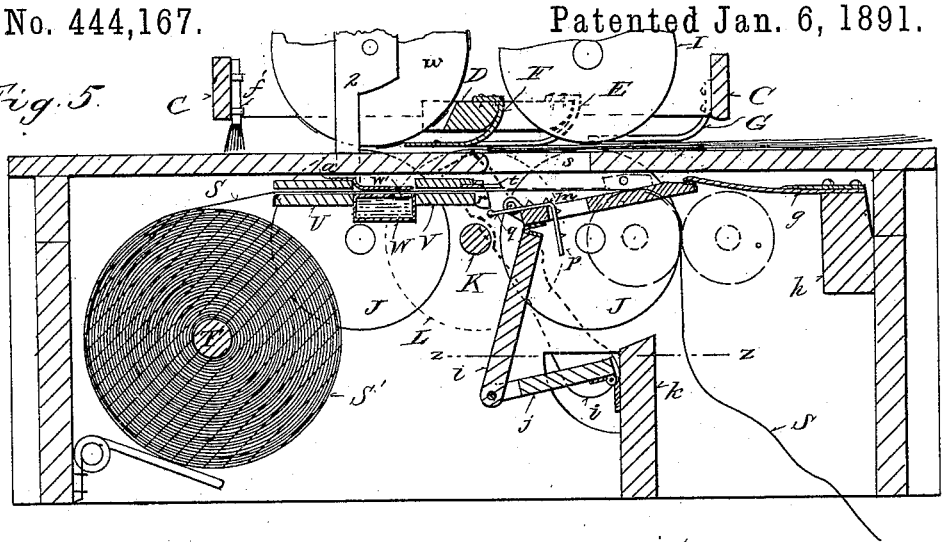
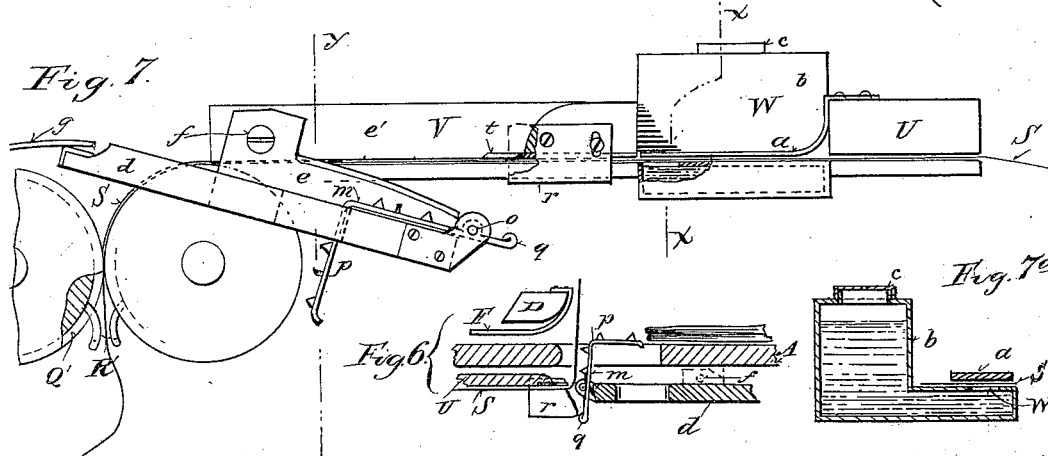
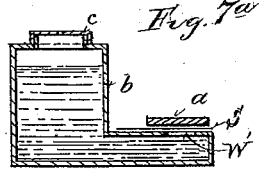
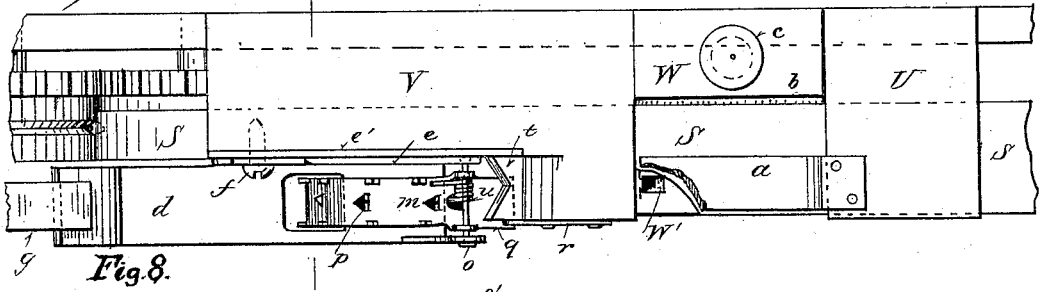
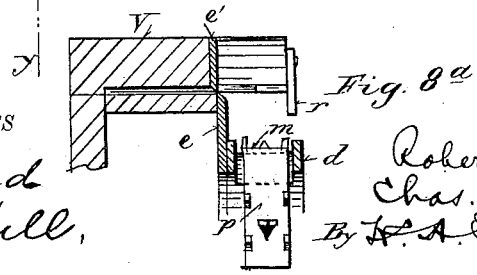
WITNESSES
INVENTORS (No Model.) 4 Sheets—Sheet 4.
R. D. BRAIN & C. T. SHAFER.
APPARATUS FOR APPLYING STRIPS TO NEWSPAPERS OR OTHER PERIODICALS.
No. 444,167. Patented Jan. 6, 1891.
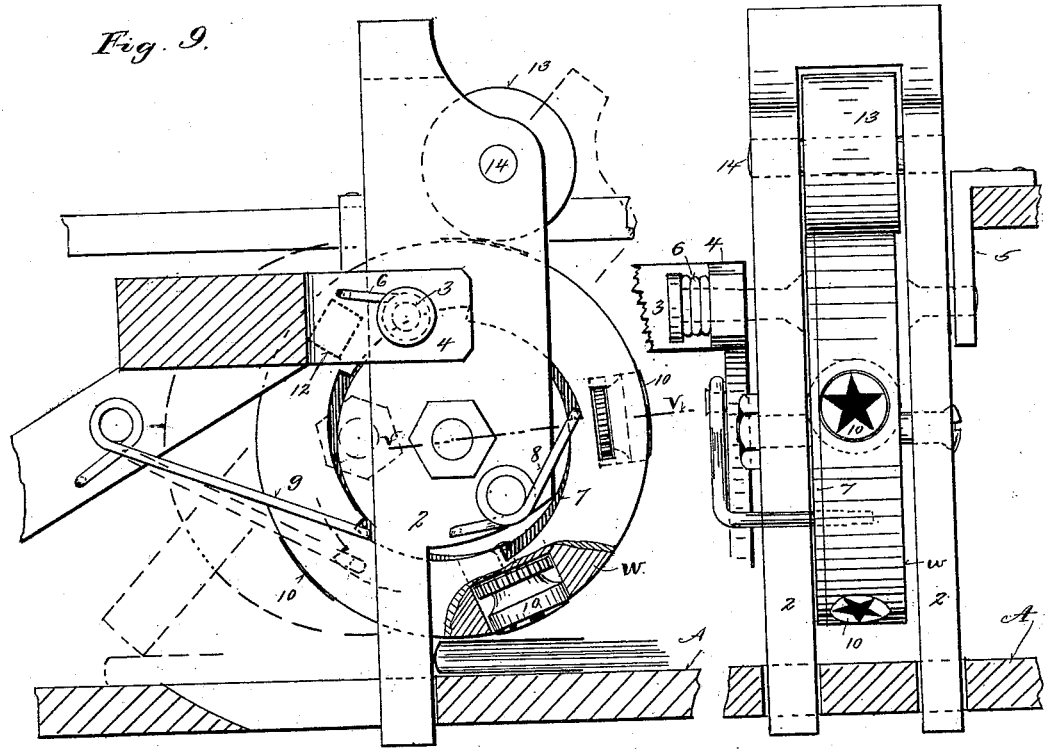
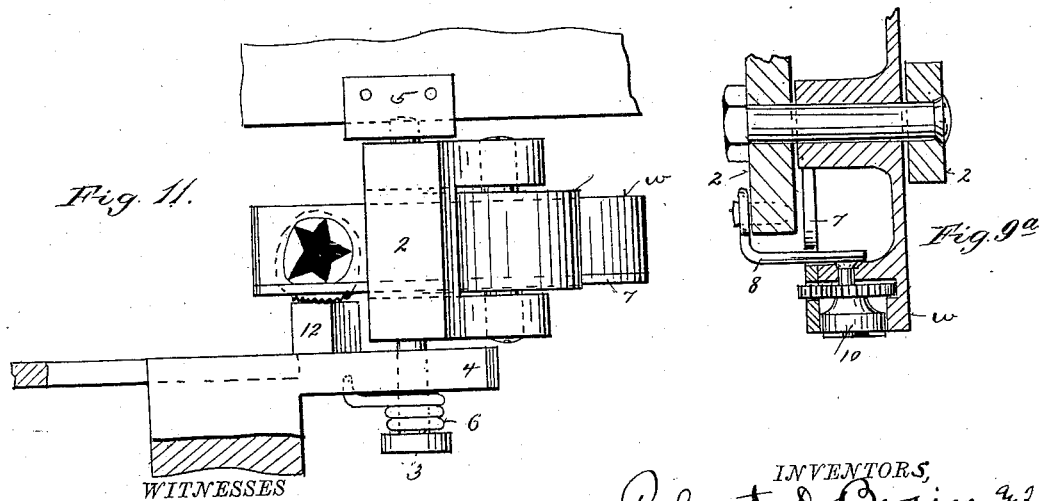

UNITED STATES PATENT OFFICE.

ROBERT D. BRAIN AND CHARLES T. SHAFER, OF SPRINGFIELD, OHIO; SAID SHAFER ASSIGNOR TO SAID BRAIN.

APPARATUS FOR APPLYING STRIPS TO NEWSPAPERS OR OTHER PERIODICALS.

SPECIFICATION forming part of Letters Patent No. 444,167, dated January 6, 1891.

Application filed June 21, 1890. Serial No. 356,189. (No model.)

*To all whom it may concern:*

Be it known that we, ROBERT D. BRAIN and CHARLES T. SHAFER, citizens of the United States, residing at Springfield, in the county of Clark and State of Ohio, have invented certain new and useful Improvements in Apparatus for Applying Strips to Newspapers or other Periodicals, of which the following is a specification, reference being had therein to the accompanying drawings.

Our invention relates to certain new and useful improvements in apparatus for applying strips to newspapers or other periodicals, and such as set forth in Letters Patent No. 402,136, granted to the said Robert D. Brain on April 30, 1889, for improvements in means for preventing the fraudulent return of periodicals; and the objects are, first, to apply a fastening-strip to a newspaper or other suitable article; secondly, to seal or mark each strip and newspaper conjointly; thirdly, to vary such conjoint design indefinitely; fourthly, to feed the fastening material by retaining a continuous hold of a portion of the same while another portion is cut off and applied to a newspaper; fifthly, to supply a suitable quantity of glue to cause the strip to adhere to a periodical without smearing up the adjacent mechanism; sixthly, to place such fastening-strip in position and to cut off the same; seventhly, to actuate the feeding and the cutting mechanism by the forward movement of the said newspaper, all of which will be hereinafter more fully explained in connection with the preferred form of mechanism for carrying these objects into practice.

Figure 3:
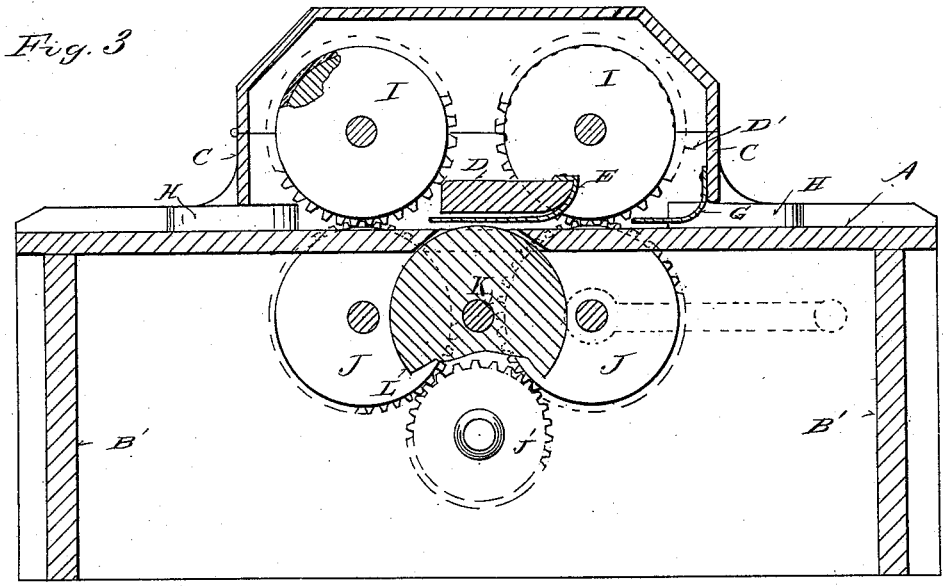
Figure 4:
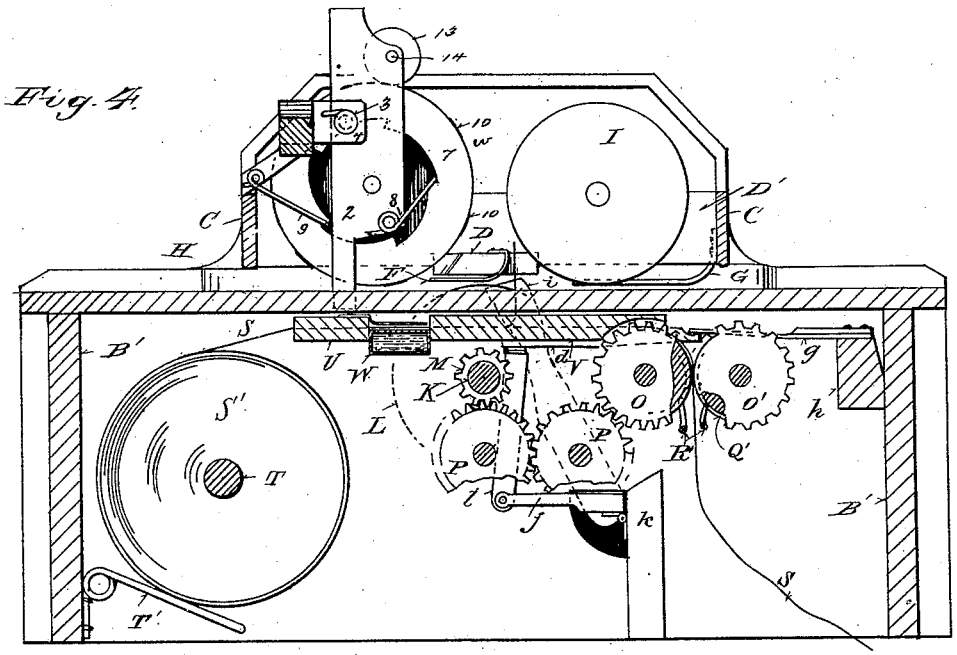

In the accompanying drawings, forming a part of this specification, and on which like reference letters and figures indicate corresponding parts, Figure 1 represents a plan view of our machine with a portion of the cross-frame broken away and one of the upper rolls removed; Fig. 1$^A$, a portion of the table and openings therein; Fig. 2, a plan view of our machine with the table removed; Fig. 2$^A$, a horizontal section on the line $z$ $z$ of Fig. 5, hereinafter described, showing a plan view of the trigger and its arm; Fig. 3, a sectional view on the line X X of Figs. 1 and 2; Fig. 4, a sectional view on the lines Y Y of Figs. 1 and 2; Fig. 5, a sectional view on the lines Z Z of Figs. 1 and 2; Fig. 6, a partial sectional view similar to Fig. 5, showing the fastening-strip raised; Fig. 7, a side elevation of the cutting mechanism viewed from the opposite side from Fig. 5; Fig. 7$^A$, a section of the glue-holder on the line $x$ $x$ of Fig. 7; Fig. 8, a plan view of Fig. 7; Fig. 8$^A$, a sectional view on the lines $y$ $y$ of Figs. 7 and 8; Fig. 9, a side elevation of the printing mechanism; Fig. 9$^A$, a sectional view on the line $v$ $v$ of Fig. 9; Fig. 10, an edge view of Fig. 9, and Fig. 11 a plan view of the same.

In business it is often desired to prevent the opening of newspapers or other periodicals, and such articles, for instance, as dress-patterns, &c., and the fraudulent copying of the same. Again, the papers, after being read, may be gathered and refolded and resold, or they may be returned to the delivery-office for the usual rebate on unsold papers. Our machine has in view the overcoming of the above difficulties and the carrying out of the aforementioned objects by the preferred form of construction now to be described.

The letter A designates the table, supported and braced by suitable side and end pieces B B', or otherwise firmly held, above which is mounted the cross-frame, consisting of strips C C, connecting the said side pieces B, and having suitable bearing-strips D D' to carry the superincumbent mechanism. The piece D carries the depressor-springs E and F, and another depressor-spring G is fastened to one of the cross-pieces C. Under these springs is passed the newspaper or other periodical to be operated on, the edges of which are guided by the edge-guides H. The newspaper, for instance, is carried through the machine by the carrying mechanism, which will now be described.

The carrier mechanism consists of upper and lower rolls, either in the form of a drum-shaft or divided, as shown in Figs. 1 and 2. The upper rollers I are mounted in the cross-frame before mentioned and in convenient proximity to said table A, while the lower rolls J are mounted beneath the said table and extend through the slots in the same, as shown in Figs. 1 and 1$^A$, so as to take hold of the newspaper and carry it on through the machine. These rolls are driven by means of toothed wheels secured to the edges of the said rolls or formed integrally therewith, the two lower rolls J being connected by an idler J', as shown in Fig. 3. The rolls may have a rubber edge or be corrugated, in order to take a firm hold upon the newspaper. A crank is preferably mounted on one of the axles of the rolls J, in order to give movement to the same, or, if desired, a pulley may drive the same, as indicated by the dotted lines in Fig. 1. As the newspaper is received by the forward rolls and carried on under the springs E, F, and G, it will be pressed down upon the table and actuate a feeding mechanism now to be described.

A shaft K, mounted below the table, carries the feed-driving wheel L, which is located directly under the spring E, and its upper edge extends slightly above the top of the table. The newspaper is pressed down thereon and causes it to rotate by friction thereon, thus turning the shaft and also a pinion M near the other end thereof, which is connected to the feed-roll gears O and O' by the idlers P. The gears are fastened to or formed integrally with the feed-rolls Q and R, which turn toward each other and are covered by rubber, or are corrugated similarly to the carrying-rolls, whereby a strip S, of paper or other suitable fastening material, is drawn from its roll S', mounted on the axle T. This strip is guided, preferably, by means of slots in the guide-strips U and V, so as to pass over a glue-pot W, having an opening W' therein and a spring a above the same pressing down upon the strip S. This removes the surplus amount of glue that is forced upward against the under side of the strip by the pressure of the glue contained in a larger portion b of the said pot, which is filled through the capped opening c. A small opening is made in said cap to communicate with the outside air. As the strip is drawn onward across the opening W' a line of glued surface is formed on the under side thereof, the surplus amount being scraped off by the forward edge of the said opening. Any other convenient means may be employed for depressing the strip instead of the spring a. After being glued the strip is drawn onward to the cutting mechanism now to be described. The feed-rolls preferably have grooves Q', in which fit fingers R', which guide the strip and prevent its rolling up on said rolls. This cutting mechanism preferably consists of a spring-actuated knife-lever d, having a knife e secured to the edge thereof and pivoted at f to the guide-strip V or other suitable support. The rear end of the lever has a spring g bearing thereon, which is secured to a block h on the said frame or otherwise, so as to bear down on one end of the lever d and elevate the other end, to which said knife is attached. A corresponding blade e' is secured to the guide-strip, its lower edge being even with the guide-slot therein, whereby the two knife-edges e and e' are caused to slide past each other with a shear-like action and slice off or sever a portion of the strip S projecting from the guiding-slot, in order to form the fastening-strip. This projecting portion is the part on which the line of glue is applied, and the spring-actuated knife-lever is lowered at its cutting end, thus bringing the spring under tension by means of a trigger mechanism now to be described.

The tendency of the spring g acts to cause the knife-blade to shear quickly past its opposing blade e'. In order to allow the feed-rolls to draw the strip forward the knife must be open, as shown in Fig. 7. This is done by means of a trigger mechanism, consisting of a trigger i, connected to a trigger-arm j, which is pivoted to a block k at one end and has a link l at the other, which is pivoted to the knife end of the said lever d, as shown in Fig. 5. When the newspaper is inserted in the machine it depresses this trigger, which extends through a slot in the said table A and a little above the surface thereof, thus causing the arm j to descend and lowering the knife end of the lever d by means of a link connection 1. At the same time the paper sliding over the feed-driving wheel L and pressed thereon by the spring E causes the feed-rolls Q and R to draw the strip S forward between the open knife-edges. As the rear end of the newspaper passes the trigger it suddenly flies upward, thus allowing the spring g to act on the knife-lever d and sever the projecting portion of the strip S. The normal position of the trigger is up and the knife is then closed. The knife is first lowered and then the feed mechanism is started, continuing until the rear end of the newspaper runs off of the driving-wheel and the trigger. A lifter m is pivotally attached at o, and preferably has a bent end p, with raised portions thereof forming points to prevent the glued strip from adhering thereto, and a projecting end q on the other side of the pivot, which engages with an adjustable stop r, secured to the guide V or otherwise, when the lever d is raised by the action of the spring g. This lifter elevates the cut-off strip to a perpendicular position, as shown in Fig. 6, through an opening s in the table, so that its glued side, which before was under, now opposes the next newspaper entering the machine. A horizontal V-shaped knife-blade t is carried by the said guide V or otherwise, so as to be even with the knife-edge e', and forms part of the stationary knife above the strip S. Any other suitable form of blade may be used; but this is a convenient form of apparatus for cutting off the fastening-strip, as will now be described.

The entering newspaper will meet the elevated fastening-strip at about the center of its length, and as the paper is carried onward will force it between the spring F and the table, whereby it will be cut off on the V-shaped knife t and fastened to the adjacent edges of the said newspaper. The rounded edge of the slot in the table and the spring F supports the fastening-strip, and thus the newspaper carries it between them and completes its engagement therewith. A brush $f'$ may also be used to press down the said strip. As the newspaper passes onward it is carried under the printing mechanism hereinafter described. It will be observed that the portion of the strip S which is not cut off by the knives acts as a feed for the fastening portion as it passes through the feed-rolls Q and R; also, that the glue is applied to only that portion of the strip to be used as a fastening-wrapper, and passing under the knife-blade $t$ and over the lifter $p$ there is no glue smeared on the adjacent mechanism, nor does the strip adhere to any portion thereof, and thus retard the movement of the same. In order to cause the quick return of the lifter after its elevation, as shown in Fig. 6, a spring $u$ is wound about its pivot and acts to depress the lifter as soon as the end $q$ is out of engagement with the stop $r$, as indicated in Figs. 7 and 8. If preferred, gravity may be relied on to return the lifter.

The printing or sealing mechanism preferably consists of a type-wheel $w$, mounted in a trip-hanger 2, which is supported on a pivot 3, carried by brackets 4 and 5. A coil-spring 6 is wound about said pivot and engages said bracket 4 to cause the hanging frame to assume a vertical position. Other means may be employed for this purpose. The lower ends of this frame extend through the openings $2'$ in the table A, or may extend only within a convenient proximity to the same, so as to be turned about their pivot when the newspaper catches them. This type-wheel $w$ has a ratchet 7 on one side edge, which is engaged by a spring-pawl 8, carried by the hanging frame, and also by a spring-detent 9, mounted on the cross-frame or otherwise. This ratchet is preferably an interior one, and it will be observed that when the newspaper strikes the lower ends of the hanging frame the pawl 8 will cause the type-wheel $w$ to be carried in its swinging motion about the pivot 3 until the hanging frame assumes the position shown in dotted lines in Fig. 9. The detent 9 then takes hold of the next tooth of the ratchet, thus detaining the type-wheel, when the frame swings backward after the newspaper has passed through and thus released its lower end. The pivotal point of the type-wheel is forward of the pivot 3 of the trip-hanger. The lower portion of the said wheel is therefore pressed down on the newspaper and its fastening-strip as the hanger swings to the dotted position. The object of this is to seal or mark the paper-fastening strip, as will be presently described. Mounted in said type-wheel are adjustable type-bars or types 10, consisting of a type-face, a ratchet, and a spindle connection with the wheel, so as to revolve therein. Any printing design may be used on said type-face to serve as a sealer or marker when brought down upon the fastening-strip and paper passing underneath. The design is adapted to mark on both the paper and the fastening-strip conjointly, as the type-wheel is so placed at one side of the opening $s$, Fig. $1^A$, that a portion of each impression overlaps the strip fastening the newspaper. A fixed type-face would impress the design in an unvarying angle or position on both the fastening-strip and the paper; but it is desired to vary the angular appearance of the design indefinitely, and this is done by the ratchet-face before mentioned, which extends out beyond the edge of the ratchet 7, as seen in the edge view of Figs. 10 and 11. A stationary pawl 12 is fastened to some suitable support, such as the outside bracket, and extends conveniently near to the type-wheel, so that each type-ratchet as it passes the said pawl 12 will be revolved a portion of its circumference, and thus form a different inclination or position of the face of the type, and thereby cause a different mark when it is brought down upon the fastening-strip and the newspaper. An ink-roller 13 is also carried by said hanging frame on a pivot 14, thus inking each type-face as it passes about the same. The roll of fastening material is sufficiently retarded by means of a spring-detent T T' bearing thereon, as shown in Figs. 4 and 5.

We do not wish to limit ourselves to the exact form and construction of the machine herein shown and described.

Having thus fully described our invention, what we claim as new, and desire to secure by Letters Patent, is—

1. In a strip-applying apparatus, the combination, with carrying mechanism for carrying a newspaper through the machine, of a cutting mechanism having knives to divide a fastening portion from a continuous strip and to sever it therefrom, and strip-feeding mechanism for feeding the strip to the knives proper, a lifter for presenting the divided portion of the strip in position for engagement by the newspaper, and a depressor to secure the attachment of the fastening-strip constituted of the severed portion to the newspaper, for the purpose set forth.

2. In a strip-applying apparatus, the combination, with carrying mechanism for carrying a newspaper through the machine, of a cutting mechanism provided with knives having a shearing action on a continuous strip of fastening material, and a strip-feeding mechanism having intergeared rollers and driven by a feed-roll actuated by the passing newspaper, a pivoted lever operated by said cutting mechanism for feeding the strip to the knives proper to present the severed portion of the strip to be engaged by the newspaper, suitable adjunctive devices to assist such engagement, and a printing mechanism located to one side and forward of the fastening-strip and adapted to print a variable seal or mark conjointly on said newspaper and its fastening-strip engaged therewith, whereby each newspaper and its fastening-strip may be identified.

3. In a strip-applying apparatus, the combination, with the carrying mechanism for a newspaper and cutting mechanism consisting of a stationary and a pivoted knife adapted to work together for severing a portion of a strip of fastening material longitudinally while the remaining portion is drawn onward, of feeding mechanism for said strip, gluing means for the fastening portion, and trigger mechanism consisting of a trigger depressed by the passing newspaper and connected to said pivoted knife.

4. In a strip-applying apparatus, the combination, with carrying mechanism for the newspaper and cutting mechanism for severing a portion of a strip of fastening material, of feeding mechanism therefor, consisting of a feed-driving wheel operated by the depressing action of the newspaper as it passes through the machine, feed-rolls adapted to feed said strip, and intermediate mechanism between said driving-wheel and feed-rolls, and trigger mechanism consisting of a trigger depressed by the passing newspaper, a trigger-arm, and link connections for operating said cutting mechanism by the release of said trigger.

5. In a strip-applying apparatus, the combination, with carrying-rolls for the newspaper and strip-feeding mechanism for the fastening material, of spring-actuated cutting mechanism to cut a portion of said material to form a fastening-strip, the other portion being drawn onward by said feeding mechanism actuated by the onward passage of said newspaper, and trigger mechanism consisting of a trigger depressed by the passage of said newspaper, and intermediate connections between said trigger and said cutting mechanism, whereby the release of said trigger as the newspaper leaves it will allow said cutting mechanism to operate and prepare a fastening-strip for the next newspaper.

6. In a strip-applying apparatus, the combination, with carrying-rolls for a newspaper, trigger mechanism and strip-feeding mechanism operated by the forward movement of said newspaper, whereby a strip of fastening material is drawn onward by said feed mechanism, and gluing means consisting of a glue-pot from which glue is forced by its own weight against a portion of said strip, of cutting mechanism to separate said portion, consisting of a stationary knife, a spring-actuated knife-lever pivoted adjacent to said knife to give a shear action, elevating means operated by said knife-lever to lift said prepared portion to engage with the newspaper, and trigger mechanism having a trigger and link connections to said cutting mechanism actuated by the newspaper to release said knife as the newspaper passes the trigger, and thus divide and raise the prepared portion.

7. In a strip-applying apparatus, the combination, with strip-feeding rolls and actuating means therefor, consisting of a friction-wheel rotated by contact with the newspaper operated on and connected to said feed-rolls to advance a continuous strip of fastening material, of opposing knife-edges having a normal tendency to act on said strip, a trigger released by said newspaper to actuate said knife-edges to divide a portion of the strip to form a fastening-wrapper, and compressing-springs to apply said wrapper to a paper, the remaining portion of the strip being drawn onward by the action of the feeding mechanism to present an uncut portion to the knife-edges.

8. In a strip-applying apparatus, the combination, with carrying-rolls for carrying a newspaper having a wrapper of fastening material secured thereon, of a type, means to vary the angular position thereof, and a vibrating support for said type actuated by said newspaper, for the purpose described.

9. In a sealer or marker, a type-wheel, a trip-hanger therefor, brackets in which said hanger is rotatably mounted, a ratchet on said wheel, a pawl therefor on said hanger, and a detent for said wheel, whereby each time the hanger is operated the pawl rotates said wheel and the detent prevents its return.

10. In a sealer or marker, a type-wheel, a trip-hanger therefor, actuating mechanism to rotate said wheel, rotatable types, and means to intermittently rotate them, whereby an indefinitely-varied appearance of the seal or mark may be produced.

11. In a sealer or marker, a type-wheel, a support therefor, types having ratchet edges rotatably mounted in said wheel, and a stationary pawl carried by said support and adapted to engage with said ratchet edges and to rotate said types, whereby a varied seal or mark may be produced.

12. In a strip-applying apparatus, the combination, with a trigger mechanism to be operated by a newspaper passing through the machine, and strip-gluing means, of a stationary knife having a lengthwise-shearing edge, and a V-shaped edge at one end of the latter, whereby the fastening-strip is severed longitudinally and transversely from the feeding portion of the fastening material, a spring-actuated knife-lever pivoted so as to work with said stationary knife, and a lifter actuated by said lever to raise the severed portion of said fastening material adjacent to said V-shaped edge and in position to be engaged by the next newspaper passing through the machine.

13. In a strip-applying apparatus, the combination, with a strip of fastening material and a feeding mechanism, of a glue-pot provided with an air-inlet in the upper portion thereof to equalize the air-pressure on the glue, and having a flared lower portion and an opening in the top of said portion, and a depressor adapted to depress the said strip carried above said opening, whereby the surplus glue forced outward against said strip by hydrostatic pressure is scraped off as the strip is drawn onward by said feeding mechanism.

14. In a strip-applying apparatus, the combination, with the strip-feeding mechanism and cutting mechanism having a knife-lever and gluing means for said strip, of a lifter pivoted to said lever, consisting of a lifting portion having points or projections to prevent the glued strip from adhering thereto, a projecting portion or arm, and a stop to engage said arm and elevate said lifter as the knife-lever is raised.

15. In a strip-applying apparatus, the combination, with strip-feeding means adapted to intermittently feed a continuous strip of fastening material, of means to operate the same intermittently by the passage of a newspaper through the machine, a glue-reservoir having an opening to smear a portion of the strip continuously as it is drawn past said opening by the feeding mechanism, a cutting mechanism consisting of a longitudinal and a transverse knife-edge acting to divide the glued portion of said material to form a wrapper for a newspaper, and means to apply said wrapper thereto, the remaining portion of the strip serving to draw the glued portion still uncut within reach of the cutting mechanism by the action of the strip-feeding mechanism upon said remaining portion.

In testimony whereof we affix our signatures in presence of two witnesses.

ROBERT D. BRAIN.
CHAS. T. SHAFER.

Witnesses:
HENRY C. DIMOND,
WM. H. GRIFFITH.